(12) United States Patent
Silverman et al.

(10) Patent No.: US 6,505,175 B1
(45) Date of Patent: Jan. 7, 2003

(54) ORDER CENTRIC TRACKING SYSTEM

(75) Inventors: Andrew F. Silverman, Holmdel, NJ (US); Matthew Lavicka, New York, NY (US); David W. Ngai, Brooklyn, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 09/413,270

(22) Filed: Oct. 6, 1999

(51) Int. Cl.$^7$ ............................................... G06F 17/60
(52) U.S. Cl. .............................. 705/37; 705/35; 705/36
(58) Field of Search ...................... 705/35, 36

(56) References Cited

U.S. PATENT DOCUMENTS

| | | | |
|---|---|---|---|
| 4,336,524 A | * | 6/1982 | Levine |
| 4,412,287 A | * | 10/1983 | Braddcok, III |
| 4,674,044 A | * | 6/1987 | Kalmus et al. |
| 4,799,156 A | * | 1/1989 | Shavit et al. |
| 4,903,201 A | * | 2/1990 | Wagner |
| 4,940,963 A | * | 7/1990 | Gutman et al. |
| 4,980,826 A | * | 12/1990 | Wagner |
| 5,038,284 A | * | 8/1991 | Kramer |
| 5,101,353 A | * | 3/1992 | Lupien et al. |

(List continued on next page.)

FOREIGN PATENT DOCUMENTS

| | | | | |
|---|---|---|---|---|
| EP | 0 448 800 A1 | * | 12/1990 | G06F/15/21 |
| WO | 95/26005 | * | 9/1995 | G06F/17/60 |
| WO | 96/41293 | * | 12/1996 | G06F/17/60 |

OTHER PUBLICATIONS

Abdelrahim, Yasser, et al., "The Securities Industry: A Comparison of the Technologies Used in Open Outcry vs. Electronic Trading", Sep. 24, 1998 <http://misdb.bpa.arizona.edu/~mis6...rts/Industry/Security/securiti.htm>.

Aken, B.R., Kenney, G.Q., IBM Technical Disclosure Bulletin, Dec. 1973, pp. 2330–2338.

Bernhard, Todd, "Wireless Messaging & Unix Expo '94", Rochester Sun Local User Group (last modified Mar. 27, 1997) <http://guinan.cc.rochester.edu/UCC/Groups/RocSLUG/wireless.html>.

(List continued on next page.)

*Primary Examiner*—Vincent Millin
*Assistant Examiner*—Jagdish N Patel
(74) *Attorney, Agent, or Firm*—Clifford Chance US LLP

(57) ABSTRACT

A computerized order centric method and system for tracking orders implemented on a trading floor exchange. The system automatically routes orders to a booth and a floor broker according to a symbol associated with the particular security being traded. The method for processing an order for a security on the floor of an exchange includes representing a security with a symbol and allocating a set of symbols to a booth. In addition a set of symbols is allocated to a floor broker ID. An order, relating to a symbol is entered into a computer and transmitting to a computer server. The order is routed through the server to a computerized booth station associated with the booth to which the order symbol had been allocated. In addition, the order is routed through the server to the floor broker ID to which the symbol associated with the order has been allocated. Typically the floor broker ID is logged into a computerized handheld device. Typically, multiple booths are utilized with a unique set of symbols allocated to each booth station. The set of symbols allocated to a floor broker ID is a unique subset of the set of symbols associated with a booth. Additionally a heartbeat signal from the handheld device to the server can be required within a predetermined time period. A floor broker can be automatically logged off of the server in the event the server does not receive a predetermined number of heartbeats.

20 Claims, 3 Drawing Sheets

U.S. PATENT DOCUMENTS

| | | | | |
|---|---|---|---|---|
| 5,297,031 | A | * | 3/1994 | Gutterman et al. |
| 5,313,051 | A | * | 5/1994 | Brigida et al. |
| 5,347,477 | A | * | 9/1994 | Lee |
| 5,459,458 | A | * | 10/1995 | Richardson et al. |
| 5,463,547 | A | * | 10/1995 | Markowitz et al. |
| 5,509,000 | A | * | 4/1996 | Oberlander |
| 5,530,438 | A | * | 6/1996 | Bickham et al. |
| 5,561,446 | A | * | 10/1996 | Montlick |
| 5,633,660 | A | * | 5/1997 | Hansen et al. |
| 5,655,088 | A | * | 8/1997 | Midorkawa et al. |
| 5,684,799 | A | * | 11/1997 | Bigham et al. |
| 5,706,442 | A | * | 1/1998 | Anderson et al. |
| 5,708,780 | A | | 1/1998 | Treese et al. |
| 5,724,106 | A | | 3/1998 | Schindler et al. |
| 5,758,328 | A | | 5/1998 | Giovannoli |
| 5,774,877 | A | | 6/1998 | Carroll et al. |
| 5,793,301 | A | | 8/1998 | Carroll et al. |
| 5,794,210 | A | | 8/1998 | Fitts et al. |
| 5,794,221 | A | | 8/1998 | Egendorf |
| 5,796,832 | A | | 8/1998 | Kanan |
| 5,797,002 | A | | 8/1998 | Patterson, Jr. et al. |
| 5,805,167 | A | | 9/1998 | van Cruyningen |
| 5,809,483 | A | | 9/1998 | DuMont et al. |
| 5,842,178 | A | | 11/1998 | Giovannoli |
| 5,864,827 | A | | 1/1999 | Wilson |
| 5,880,726 | A | | 3/1999 | Yokoyama et al. |
| 5,911,137 | A | | 6/1999 | Hill et al. |
| 5,915,245 | A | | 6/1999 | Carroll et al. |
| 5,918,214 | A | | 6/1999 | Perkowski |
| 5,943,678 | A | | 8/1999 | Hocker et al. |
| 6,011,790 | A | * | 1/2000 | Fisher ..................... 370/349 |

OTHER PUBLICATIONS

Blades. J.A., IBM Technical Disclosure Bulletin, Dec. 1994, pp. 115–116.

Boydston, Barbara, "US Marts Ready Handheld Technology", Wall Street Letter, vol. 27, No. 25, Jun. 26, 1995, p. S1.

Broida, Rick, "Hewlett–Packard OmniGo 120", Home Office Computing, Dec. 1996, p. 122 <http://www.productreviewnet.com/abstracts/4/4084.htm>.

Broida, Rick, "Motorola Envoy 150", Home Office Computing, Dec. 1996, p. 123 <http://www.productreviewnet.com/abstracts/4/4085.htm>.

Bunker, Ted, "Computers & Automation", Investor's Business Daily, Jun. 8, 1993, p. 4.

Burke, Gibbons, "Computers and Trading Growing Together", Futures: The Magazine of Commodities & Options, vol. 21, No. 8, Jul. 15, 1992, pp. 8–9.

Burnett, Richard, "Laserlight Plugs Into Stock Market", Orlando Sentinel Tribune, Mar. 15, 1993, at Central Florida Business p 15.

Burns, Greg, "A Handheld Computer that's Combat–Hardened", Business Week, Apr. 18, 1994, pp. 94–96.

Church, Emily, "Global Network Ambitions", CBS MarketWatch, last updated 12:24 PM ET Jul. 13, 1999 <http://cbs.marketwatch.com:80/arch...rrent/egrp.htx?source=htx/http2_mw>.

Clarke, Roger, "Commodity Futures Trading at the CBOT", Xamax Consultancy Pty Ltd., Mar. 1994, <http://www.anu.edu.au/people/Roger.Clarke/EC/PaperOLTCBOT.html>.

Crawford Jr., William B., "Exchanges Choose Team to Produce Trading Card", Chicago Tribune, Jun. 4, 1993, at Business p. 1.

Currie, W. Scott, "The ISO Link Layer and Above", LANs Explained: A Guide to Local Area Networks, Ellis Horwood Limited, England, 1989, Ch. 11.

Davis, Stephen, "1992 in Review; Technology", Wall Street Letter, vol. 25, No. 1, Jan. 11, 1993, p. 16.

Dommel, Hans–Peter, and Garcia–Luna–Aceves, J.J., "Floor Control for Networked Multimedia Applications", Position Paper for the SIGCOMM '95 Technical Symposium, 1995 <http://www.cse.ucsc.edu/research/c...peter.sigcomm95.mwws.pospaper.html>.

Eyerdam, Rick, "Plugged In: Real Time Stock Data Takes Off", South Florida Business Journal, vol. 13, No. 26, Feb. 19, 1993, Sec. 1, p. 3.

Frankhauser, Mahlon M., "New and Intrusive Regulation of the Futures Market May Affect the Securities Markets", Insights, vol. 8, No. 1, Jan. 1994, p. 21.

Groz, Marc M., "Revolution on Wall Street", PC Magazine Online, Jul. 1, 1998 <http://www.zdnet.com/pcmag/news/trends/t980701a.htm>.

Hoffman, Thomas, "Amex Seeks Wireless Trades", Computerworld, May 17, 1993, p. 6.

Hoffman, Thomas, "Handhelds Beat Paper on Stock Exchange Floor", Computerworld, Nov. 25, 1998 <http://cnmn.com/TECH/computing/9811/25/handhelds.idg/>.

Ivey, Barbara, "Tool Project Wireless Email" (last updated May 10, 1995) <http://www.cox.smu.edu/class/mis4350h/people/bivey/tool/tool.html>.

Jordan, Miriam, "Translation: 'Profits': Gadgets Spell Success for Group Sense", The Asian Wall Street Journal, Mar. 3, 1993, p. 4.

Kalish, David E., Electronic Big Board NYSE Automating Trading, but Keeps Some Human Contact, Pittsburgh Post–Gazette, Aug. 20, 1994, at B7.

Kalish, David E., "NYSE Takes $125M Computer Step to Combat Moves by Rival Nasdaq", The Star–Ledger Newark, NJ, Aug. 12, 1994.

Lashinsky, Adam, "Pits Prayer: Palms Someday", Crain's Chicago Business, Aug. 9, 1993, p. 18.

Levinson, Alan, "Wall Street Warms to the Confused World of Wireless", Wall Street & Technology, vol. 11, No. 9, Jan. 1994, pp. 44–48.

Lu, Cary, "The PDA Comeback?", Macworld, Jul. 1996, p. 102 <http://www.productreviewnet.com/abstracts/4/4215.htm>.

Munford, Christopher, "Chicago's Exchanges Hold Electronic Hands", American Metal Market, vol. 101, No. 29, Feb. 12, 1993, p. 16.

Natarajan, K.S. "Efficient Group Acknowledgement Scheduling in Wireless Data Links", IBM Technical Disclosure Bulletin, Apr. 1994, pp. 533–534.

Oberholtzer, Gregory, "Software Reviews: Composer and Clarity", Futures: The Magazine of Commodities & Options, vol. 20, No. 4, Mar. 1991, p. 70.

Pettit, Dave, "Buttonwwod to Buck Rogers: NYSE Charting High Tech Course", Dow Jones News Service—Ticker, Aug. 5, 1994.

Pettit, Dave, "Buttonwood to Buck Rogers –2: NYSE to Detail Plans Next Week", Dow Jones News Service—Ticker, Aug. 5, 1994.

Pettit, Dave, "More Electronic Gadgetry Seen As NYSE Brokers Go Wireless", Dow Jones News Service—Ticker, Aug. 11, 1994.

Pettit, Dave, "Technology Outruns Even the Runners on Wall Street", Wall Street Journal, Aug. 19, 1994, at B6D.

Picot, Arnold, Bortenlaenger, Christine, and Roehrl, Heiner, "The Automation of Capital Markets", JCMC, vol. 1, No. 3 (as of Oct. 25, 1999) <http://www.ascusc.org/jcmc/vol1/issue3/picot.html>.

Riordan, Teresa, "Patents; an Appeals Court Says a Mathematical Formula Can be Patented, if it is a Moneymaker", N.Y. Times, Aug. 3, 1998, at D2.

Roser, F.J., "Customer Service Dispatch Aid", IBM Technical Disclosure Bulletin, Jun. 1979, pp. 198–199.

Schmerken, Ivy, "Off–Exchange Trading Chips Away at NYSE Volume", Wall Street & Technology, vol. 10, No. 4, p. 42.

Semilof, Margie, "AMEX to Test Wireless Devices", InternetWeek, Mar. 29, 1993, p. 19.

Sena, Michael L., "Computer–Aided Dispatching", Computer Graphic World, vol. 13, No. 5, May 1990, pp. 34–42.

Smith, Carrie R., "Tossing Out Tickets", Wall Street & Technology, vol. 11, No. 13, pp. 52–58.

Smith, Ian, "CS6751 Summer '94 Course Notes", Georgia Inst. of Technology, Summer 1994 <http://www.cc.gatech.edu/computing...751_94_summer/noteshome.html>.

Stein, Jon, "The Lennox System; Evaluation", Futures: The Magazine of Commodities & Options, vol. 20, No. 3, Feb. 1991, p. 64.

Thomas, Peter, "Personal Information Systems: Business Applications", Stanley Thornes, Cheltenham, UK, 1995.

Walter, Mark, "Electronic Delivery: Matching Technology to Requirements", Seybold Report on Desktop Publishing, vol. 7, No. 4, Dec. 1, 1992, pp. 3–25.

Wells, Rob, "Stock Exchanges Fine Tune Business to Retain and Attract Companies", Associated Press, Aug. 1, 1993, at Business News.

Williams, Stephen M., "High Technology Now Aiding Investors", The Hartford Courant, Mar. 7, 1993, at C1.

"AMEX Chairman Pitches Mart to Growing Biotechs as Handheld Hits Options Floor this Week", Wall Street Letter, vol. 25, No. 15, Apr. 19, 1993, p. 5.

"AMEX Expects to Pilot Handhelds by Year End", Wall Street Letter, Aug. 17, 1992, p. 8.

"AMEX Gets a Hand", InformationWeek, Mar. 22, 1993, p. 15.

"AMEX's Handheld Pilots Rescheduled for 2Q", Wall Street Letter, vol. 25, No. 8, Mar. 1, 1993, p. 7.

"Bug Fixes Will Push Audit Test Into April", Wall Street Letter, vol. 25, No. 8, Mar. 1, 1993, p. 7.

"Buttonwood to Buck Rogers –3: Avoiding Nasdaq–Like Snafu", Dow Jones News Service—Ticker, Aug. 5, 1994.

"Categories of Futures/Options Firms", Futures: The Magazine of Commodities & Options, vol. 21, No. 15, Jan. 1, 1993, pp. 7–27.

"Chicago Marts Will Pilot Handhelds in March", Wall Street Letter, vol. 25, No. 41, Oct. 11, 1993, p. 9.

"COMEX Introduces Handhelds for Pit Reporters . . . ", Wall Street Letter, Oct. 12, 1992, p. 7.

"Electronic Trading: Primex Faces Much Competition", Pensions & Investments, Jun. 14, 1999, p. 47 <http://library.northernlight.com/CK19990630010000495.html?cb=0/&sc=0>.

"Equities and Options Marts Lead the Way in Hand Helds", Wall Street Letter, vol. 26, No. 24, Jun. 20, 1994, p. 2.

"Goldman Swoops on Electronic Trader", New York Times, Jul. 14, 1999 <http://www.smh.com.au:80/news/9907/14/text/business25.html>.

"Hand–Held Price Reporting System Launched", Wall Street & Technology, vol. 10, No. 4, p. 14.

"Hand–Held Terminal Pilots", AMEX Technology Update, Oct. 1993.

HomeRF Web Site <http://www.homerf.org/>.

"ICV Adds to Comstock, Rolls Out New Packages", Dealing with Technology, vol. 3, No. 14, Jul. 5, 1991.

"Insider", Dealing with Technology, vol. 3, No. 23, Nov. 22, 1991.

"New York Stock Exchange Getting Electronic Facelift", Chicago Tribune, Aug. 22, 1994, at Bunsiness p. 4.

"NYSE Eyes CBOT/CME's Audit", Wall street Letter, vol. 25, No. 25, Jun. 28, 1993, p. 2.

"NYSE Group Pitches Options Hand Held to AMEX, Eyes CBOE", Wall Street Letter, vol. 26, No. 24, Jun. 20, 1994, p. 6.

"NYSE Plans to Launch Electronic Trading System", Yahoo News, Nov. 5, 1999 2:41 PM ET <http:dailynews.yahoo.com/h/nm/19991105/wr/markets_nyse_1.html>.

"NYSE Requests SEC Approval for Wireless Technology", Wall Street Letter, vol. 27, No. 23, Jun. 12, 1995, p. 8.

"NYSE Stalled On Choosing Network Integration", Wall Street Letter, vol. 26, No. 40, Oct. 10, 1994, p. 8.

"NYSE to Implement Floor–Wide Re–Engineering Scheme", Wall Street Letter, vol. 26, No. 2, Jan. 17, 1994, p. 1.

"NYSE to Launch Electronic Trading System", Yahoo News, Nov. 8, 1999 12:36 AM ET <http:dailynews.yahoo.com/h/nm/19991108/wr/markets_nyse_5.html>.

"NYSE to Upgrade Floor Broker Support System This Year", Wall Street Letter, vol. 25, No. 2, Jan. 18, 1993, p. 10.

"Pacific Exchange Implements Proxim RangeLAN2 Wireless LAN to Extend Information and Electronic Trading Onto Floor", Proxim (accessed Jul. 19, 1999 10:23 AM ET) <http://www.proxim.com/solution/finance/pse.shtml>.

"Papyrus Technology: Institutional Trading for Individual Investors with Clarity", Futures: The Magazine of Commodities & Options, vol. 21, No. 8, Jul. 15, 1992, p. 63.

"Patents Awarded to Connecticut Residents", The Hartford Courant, Aug. 2, 1999, at D15.

"The PDA Seeks its Fortune", InformationWeek, Jun. 13, 1994, p. 60 <http://library.northernlight.com/C...17020010823.html?cb=0&dx=1004&sc=0>.

"Personal Digital Assistants (PDAs)", NTIS, Aug. 1993 <http://library.northernlight.com/DG199990402060683778.html?cb=0&sc=0>.

"Pick a Card, Any Card?", Waters, Winter 1993, pp. 22–25.

"Software Still Missing", InformationWeek, Jun. 13, 1994, p. 62 <http://library.northernlight.com/C...17020010864.html?cb=0&dx=1004&sc=0>.

". . . Soon to be Followed by Coffee, Sugar & Cocoa", Wall Street Letter, Oct. 12, 1992, p. 7.

"Tiny Terminals are Large Concern in '94 for Amex", Wall Street Letter, vol. 26, No. 2, Jan. 17, 1994, p. 9.

"Trading Floors/Electronic Trading Systems", City of Bits WWW Team (1995–1997) <http://mitpress.mit.edu/e–books/Ci...loors Electronic TradingSystems.html>.

"Two–Dollar Broker Becomes NYSE Member to Ensure Handheld Use", Wall Street Letter, vol. 26, No. 47, Nov. 28, 1994, p. 6.

"Virtual Managers", InformationWeek, Jun. 13, 1994, p. 42 <http://library.northernlight.com/C...17020010740.html?cb=0&dx=1004&sc=0>.

WLI Forum Web Site <http://www.wlif.com/>.

"Financial Information Exchange Protocol (FIX)", Jun. 30, 1999, first published Mar. 31, 1999.

Cover, Robin, "The XML Cover Pages; FIXML—A Markup Language for the FIX Application Message Layer", <http://www.oasis-open.org/cover/fixml.html>, last modified Mar. 31, 1999.

Heike Wipperfurth, NYSE catches heat from brokers on surveillance plans Investment Dealers Digest Jul. 6, 1998.*

Peter Chapman, Beyond the Fringe, Traders, Aug. 1, 1999.*

* cited by examiner

ORDER CENTRIC TRACKING SYSTEM

CROSS-REFERENCE TO RELATED APPLICATIONS

This application cross-references and incorporates by reference the application Ser. No. 09/413,150 entitled Handheld Trading System Interface filed Oct. 6, 1999.

BACKGROUND OF THE INVENTION

1. Field of the Invention

The present invention generally relates to a system and method for tracking orders on an exchange floor. More specifically it relates to an integrated computer system for allocating, tracking and reporting orders and trades executed in the context of an exchange setting, such as the New York Stock Exchange (NYSE).

2. Description of the Related Art

There exist several types of financial markets in which securities, commodities, and other negotiable instruments are traded. An auction market, such as a stock exchange, is one such financial market. In an auction market, buyers and sellers congregate on an exchange floor and announce their respective bid prices (offer to buy) and ask prices (price acceptable to sell). A trade in any particular security will occur at no more than the highest price a buyer is willing to pay and at no less than the lowest price a seller is willing to accept.

Among the players on the floor of an exchange are specialist and floor brokers. A specialist calls out the best bid and ask prices received from the various brokers, ensures that trades are posted, facilitate trades, and acts to ensure liquidity. A floor broker roams the exchange floor and acts as an agent to transact orders on behalf of investors (buyers and sellers).

A typical transaction originates when an order is placed with an off-the-floor trading desk to buy or sell a particular security. The trading desk may then convey the order to a exchange clerk who notes the parameters of the order including whether the order is a buy or sell order, the symbol of the security, the quantity, the price, any special conditions associated with the order, and the time that the order is placed. The clerk then delivers the order to a floor broker for execution. Traditionally, orders are transcribed onto order slips that are delivered to floor brokers by pages or runners. A floor broker executes an order, notes the executed order on a slip of paper, and subsequently returns the notated slip of paper to the clerk via a runner.

In addition to buy and sell orders, investors may request a "look" from the floor of the exchange. In response to a "look" request, a broker notes his or her observations with respect to what is happening in the market for a particular security. The "look" information noted by the broker may vary depending on the particular broker and what he has observed. For example, "look" information may include recent buyer and seller identities, trade sizes and prices, appraisal of market interest, a broker's opinion and any other information that a broker may wish to provide.

There is currently a significant manual component to process an order once the order reaches the floor of an exchange. Typically, an order will be entered into a computerized order processing system of a trading establishment. For example, these orders can be entered by a trader 120 at a listed desk. The order is then routed to an order management system for exchange listed securities. The order is displayed via an order management system application in a trading booth that handles orders for the given security. An order ticket is then automatically printed in the booth.

A clerk takes the ticket from the printer and prepares it for handoff, pages a broker, and acknowledges the order in the order management system. The broker, upon being paged, returns to the booth to get the machine-printed ticket and briefly discusses any special handling instructions with the clerk. Alternately the broker may telephone the booth to get necessary information and write it on a piece of paper.

A broker must update running totals representing how many shares of a particular security to buy or sell incorporating on the new order. The broker executes a trade for all or part of the order. The broker must convey some or all of the details of the trade to the booth. The broker an convey the information over the phone or write the information on a piece of paper and walk it back to the booth. Alternatively, the broker can send the paper to the booth via an exchange runner.

A clerk typically records the verbal execution into an online management system and performs an allocation of a portion of the shares of a security amongst a variety of orders.

Contra breakdown tracking what was traded with whom eventually arrive in the booth on a piece of paper if they were not attached to the verbal. This information could have been penned by the broker or by a specialist. The clerk files the contra breakdowns in a special location, to be picked up by a firm runner. The contra breakdowns are taken to a bank of firm typists located near the exchange floor. The typists enter the information into a firm trading system, and this information is both used by the trading firm systems and it is sent to the exchange's order reconciliation system (OCS).

The contra information should be entered within an hour after the trade took place. The typists file the paper containing the verbal and written information. This paper is kept on hand for several days and is then archived.

It would be useful to have a system capable of achieving greater order processing efficiency. Orders need to be routed more quickly to brokers operating on the floor of the exchange, thereby leading to more timely customer service. In addition it would be useful to capture some of the order information digitally at the point of sale, whereby costly transcription errors can be reduced.

SUMMARY OF THE INVENTION

Accordingly, this invention provides an order centric method and system for tracking orders implemented on a trading floor exchange. The system automatically routes orders to a booth and a floor broker according to a symbol associated with the particular security being traded.

In one aspect of the invention, a method for processing an order for a security on the floor of an exchange includes representing a security with a symbol and allocating a set of symbols to a booth. In addition a set of symbols is allocated to a floor broker ID. An order, relating to a symbol is entered into a computer and transmitting to a computer server. The order is routed through the server to a computerized booth station associated with the booth to which the order symbol had been allocated. In addition, the order is routed through the server to the floor broker ID to which the symbol associated with the order has been allocated. Typically the floor broker ID is logged into a computerized handheld device.

In addition, a record of an action relating to the order can be sent to the server and logged into a memory at the server.

The record can also be routed through the server to the booth station associated with the booth to which the order symbol had been allocated. Typically, multiple booths are utilized with a unique set of symbols allocated to each booth station. The set of symbols allocated to a floor broker ID is a unique subset of the set of symbols associated with a booth.

In another aspect of the invention, a heartbeat signal from the handheld device to the server within a predetermined time period. In one embodiment, any communication between the handheld device and the server suffices as a heartbeat. A floor broker can be automatically logged off of the server in the event the server does not receive a predetermined number of heartbeats. For example, the predetermined number of missed heartbeats can be two.

In another aspect, an order is for shares of a security stock described by a symbol and the system calculates an aggregate number of shares of stock for standing orders relating to a particular symbol. Additionally, the system can calculate an aggregate of pending orders that meet a threshold price. The orders can include buy orders or sell orders.

This invention can also include a computerized system for processing an order in a trading exchange. The system can include a computerized booth station and a handheld computing device linked by a computer server. Software operative with the computer server can route an order to a particular booth station according to a security symbol associated with the order. In addition it can route the order to a particular handheld computing device according to the security symbol associated with the order.

In still another aspect, the computerized system can be linked to a computerized order management system and a computerized recording station.

BRIEF DESCRIPTION OF THE DRAWINGS

A specific embodiment of the present invention will be described with reference to the following drawing, wherein.

DETAILED DESCRIPTION OF THE INVENTION

Figure 1:
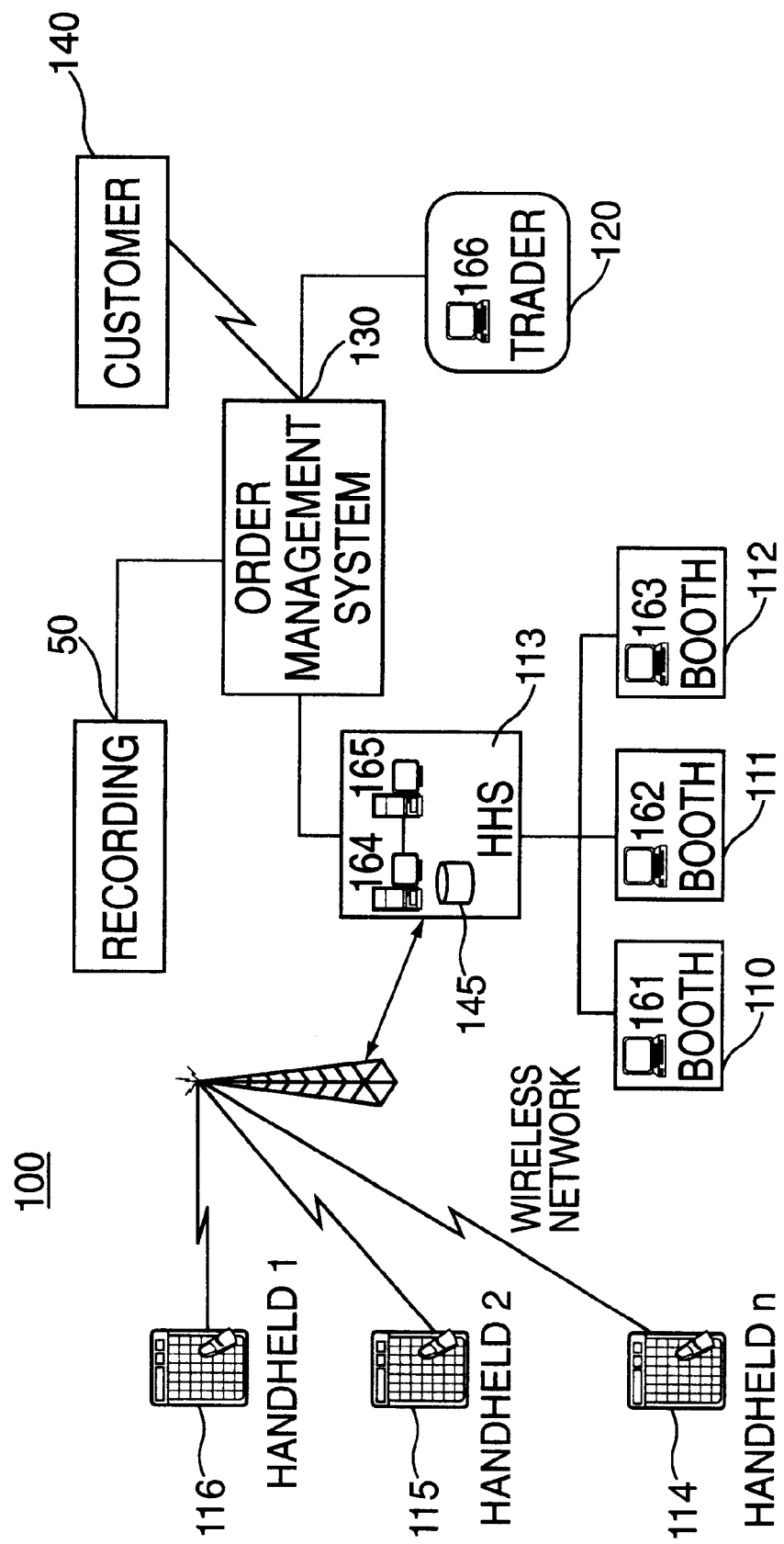
FIG. 1 illustrates an order centric tracking system.

Referring now to FIG. 1 a networked computer system 100 for tracking an order executed on an exchange floor is illustrated. A trader 120 can initiate an order to be executed on the floor of an exchange. The order is entered into an online management system 130. The online management system 130 can transmit the order to a Handheld Server (HHS) 113 and to a computerized booth station 161–162. The HHS 113 can transmit the order to a handheld computing device 114–116.

The order centric trading system 100 includes a network connecting the computerized Handheld Server (HHS) 113 and handheld computing devices 114–116. The system can also include computerized booth stations 161–163, computerized trader stations 166, computerized recording stations 150, computerized customer stations 140 and a computerized online management system 130. Each of the computerized devices 114–116 130 140 150 161–166 can include a processor, memory, a user input device, such as a keyboard and/or mouse, and a user output device, such as a video display and/or printer. The computerized devices 114–116 130 140 150 161–166 can communicate with each other to exchange data. Interactions with the Handheld server 150 and the online management system 130 can proceed as if each was a single entity in the network 100. However, the HHS 113 and the online management system 130 may include multiple processing and database sub-systems, such as cooperative or redundant processing and/or database servers 164–165, that can be geographically dispersed throughout the network 100. A local server 164–165 may be a proxy server or a caching server. The HHS 113 may also include one or more databases 145 storing order related information.

Figure 2:
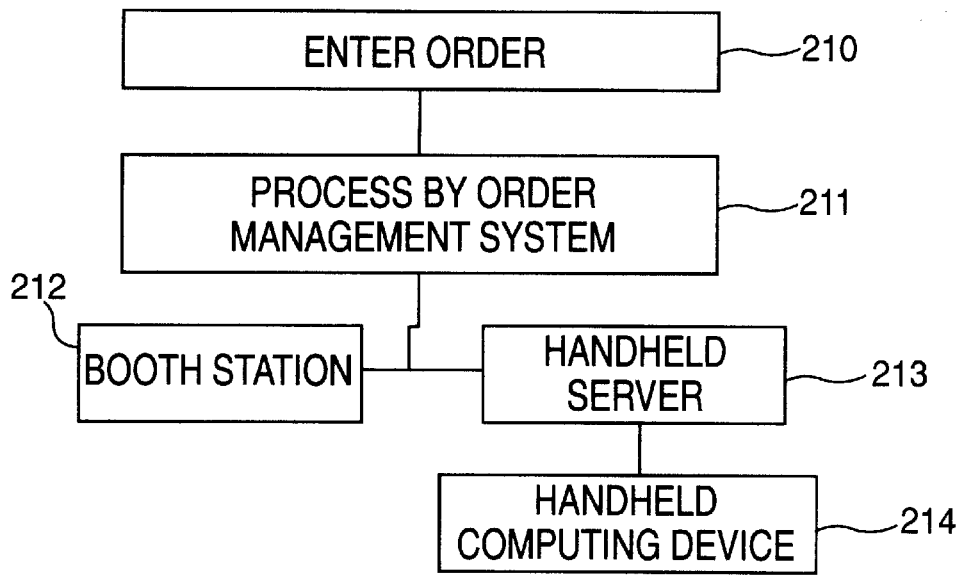
FIG. 2 illustrates a flowchart of order processing steps.

Referring now to FIG. 2, a trader, customer or other person with access to the Order Management System 130 initiates a trade by entering an order 210 into a network access device such as, for example, a computer. The Order Management System 130 processes the order by properly logging the order and allocating it to a broker ID and a booth, according to the symbol of the security involved in the order. The Order Management System 130 then performs the step of transmitting the order to a booth station 212 and the step of transmitting the order to the Handheld server 213. The handheld server in turn transmits the order to a handheld computing device onto which a Broker ID associated with the security symbol is logged.

Brokers can enter executions according to orders received into a handheld computing device 114–116. The information relating to the orders is transmitted to an online management system for exchange-listed securities.

The broker can click "buttons" and other user interface devices displayed on the screen of the handheld computing device 114–116 thereby recording the symbol, side, price, and quantity of an execution. Contra breakdowns and other relevant information, such as an "as of" time can also be captured on a handheld computing device 114–116. Trading firm personnel, such as booth clerks, can perform allocations of the executions using an online management system. The handheld computing device 114–116 can receive updated leaves based on the clerk's allocation. A typist at a recording station 150 can enter written information using the broker's digital records.

A handheld computing device 114–116 used on an exchange floor can be capable of TCP/IP communication over a wireless network 119. The wireless network is typically supported by the trading exchange. However, the handheld computing devices 114–116 can also establish a direct TCP/IP socket connection to a handheld server 113 and not be required to use exchange middleware wireless networks 119.

Each order that arrives at the handheld 114–116 can be accepted or rejected by the broker. If an order is rejected, it can appear in a "ghosted" state until explicitly dismissed by the broker.

A broker will be able to execute trades in accordance with outstanding orders that have been transmitted to the handheld computing device 114–116. The order centric system is able to keep a broker aware of how many shares to buy and sell of a particular security and at what price levels are acceptable. A handheld 114–116 can be used to assist a broker in this task by maintaining a list of outstanding orders and aggregating the leaves of like orders.

The broker will be able to record executions on a handheld computing device 114–116. In one embodiment, order processing functionality can include execution information captured semantically such as the symbol, side, quantity and price relating to the trade. Information including contra information, time of day, special instructions, and almost any other information relating to an order can also be recorded via a handheld computing device 114–116.

The order centric system 100 can record, in a history log, a number of significant events that occur relating to an order. The history log can be stored in an electronic storage medium such as a magnetic disc drive or a compact disc (CD). The log can provide a means whereby a broker can review information during the trading day. Tasks can be presented to a user in a manner that will give the user a quick view of what actions have been performed relating to an order or a group of orders. Tasks tracked by the order centric system can be displayed in chronological order, or according to filtering and sorting functionality.

Users can include a trader 120, a booth clerk, a broker, a typist or others with access to the order centric system. In one embodiment, a user can be a customer 140 with remote access to the order centric system. Customers 140 may be given access rights to view orders they have placed. In addition, if desired, customers can be given the ability to track trades placed by others whereby the customer can get a "feel" for the trading environment at any particular time without specifically requesting a floor look.

In one embodiment, task history data will also be stored on a handheld computing device 114–116. Data can be purged from a handheld computing device 114–116 at the beginning of each new trading day or more frequently as required based on device memory constraints. Purging can be subject to network failure recovery as discussed in more detail below.

In addition to the general history, a separate database can be maintained on the HHS 113 to store executions that have been entered during the course of the day. The separate database will allow brokers to reconcile executions with the booth in failure recovery situations.

To increase security, the order centric system can have the ability to encrypt the message stream between a handheld 114–116 and the HHS 113.

A Handheld Server 113 can manage communication between existing trading firm systems 130, trading exchange systems and the handheld computing devices 114–116. Each handheld 114–116 can establish a communication session with HHS 113 over a wireless network, and HHS 113 will participate in order processing systems on behalf of the handheld computing devices 114–116. HHS 113 can also maintain login session state for the handheld computing devices 114–116. HHS 113 can act as a pass-through, performing protocol conversion between a trading firm's Order Management Architecture and a handheld messaging protocol.

An order centric system can allow an order to be entered into a computerized order management system. Typically, an order is entered by a trader on the Listed desk of a firm. The order is routed to the order management system for exchange-listed securities. The order can also be displayed in the order management system application in the booth that handles orders for the given security. In one embodiment, the order centric system automatically routes the order to a broker who handles for that particular security. In another embodiment, a clerk or trader can route the order to a broker.

The order centric system pages the floor broker. No paper ticket needs to be generated. The broker, upon being paged, notices the new order on his handheld 114–116. The broker accepts the order, and the order is added to the list of active orders.

The online management system display updates and shows that the designated broker has accepted the order. The broker can execute a trade for all or part of the order on the exchange floor. The broker can record the symbol, side, price, and quantity by clicking or otherwise operating programmable user interface devices on the screen of the handheld. The broker can also record the contra breakdowns with a freehand image or "digital ink". The image recorded in digital ink can be processed for character recognition or sent as a simple image. When the broker is satisfied with the content of the recording, they can click Send to transfer the recording to the server. The handheld 114–116 can estimate an allocation of the shares of the security traded and update the leaves to reflect allocation. The execution is transmitted into the online management system.

The clerk, typically located in the booth, can access a display of an execution that has been transmitted to the online management system. The clerk can perform an allocation with the traded securities if appropriate. The image of the contra breakdowns will also be available to the clerk.

Allocations performed by the clerk are in turn transmitted to the HHS 113 and logged. The allocations are also transmitted from the HHS 113 to the floor broker via a handheld 114–116 computing device 114–116. The handheld 114–116 114–116 receives the updated leaves according to the clerk's allocation and the effects are displayed.

In addition, the allocated execution is also transmitted to the typists with any inked breakdowns whereby they can record the "writtens." The file containing the image of the breakdowns can also be archived. Archives can be accomplished, for example, in an electronic storage medium, such as a disc drive or CD.

In one embodiment, the trading firm can utilize an application that permits bulk display and/or printing of the inked breakdown images.

A order centric trading system can also include a failover procedure. In the event of a primary network failure, the handheld 114–116 114–116 can attempt to connect to a backup server 131.

In addition, an order centric trading system 100 can include features such as the ability to digitally accept all execution information at the point of sale, enhanced messaging between brokers, traders, and clerks, electronically deposit orders with the specialist, and receipt of analytics on the HHD. Analytics can include market data, statistics, trends or other information useful to accomplishing an educated trade.

In addition the order centric system can operated over an intermediary network system, such as a network system installed in an exchange for communication to and from the floor of an exchange.

A login session in the order centric system will include any actions entered by a broker after they have logged in to a computerized handheld device 114–116. A execution history database can be utilized to record order requests, executions, and other detailed information about a login session. In one embodiment a history can be cleared whenever a new login session is initiated or more frequently as needed based on available RAM.

An execution history database can be used in recovery situations (such as when a session was abnormally terminated) to reconcile executions entered on the handheld 114–116 with those received by the online management system. Once entered on the handheld 114–116, an Execution can be stored in this execution history database. The database can remain until it is manually removed by the user or until the handheld 114–116 receives allocation data for the execution. In one embodiment the execution history database can be implemented with a Windows CE database rather than volatile application memory so that the data can exist across application sessions. In another embodiment, the contents of the database will be deleted the first time that the handheld 114–116 application is launched each day.

For example, information about an execution that can be stored in the database can include: HHD Execution ID—an Execution identifier created by the HHD during the creation of execution, Online Mgmt. Execution ID—identifier assigned by the onlne management system, Security Ticker Symbol Side, Quantity, Price, Timestamp and Status including unsent, sent, confirmed, allocated, failed.

In another embodiment, the digital ink image can be discarded to conserve memory after the handheld 114–116 receives a message indicating that the execution has been allocated.

The online management system can communicate with the server in the context of a "session". A session uniquely identifies a handheld 114–116 and messages that have been sent to a particular handheld 114–116. Any response or message originating from the handheld 114–116 (except the initial login-request message, when the identifier is not yet available) will include the session identifier so that the server can correctly process the message information. Similarly, all messages arriving from HHS 113 will also contain the session identifier. Both HHS 113 and HHD can compare the session identifier, along with other tracking information in the header of all messages, to their internal values to help determine if there has been a communications or application error.

Figure 3:
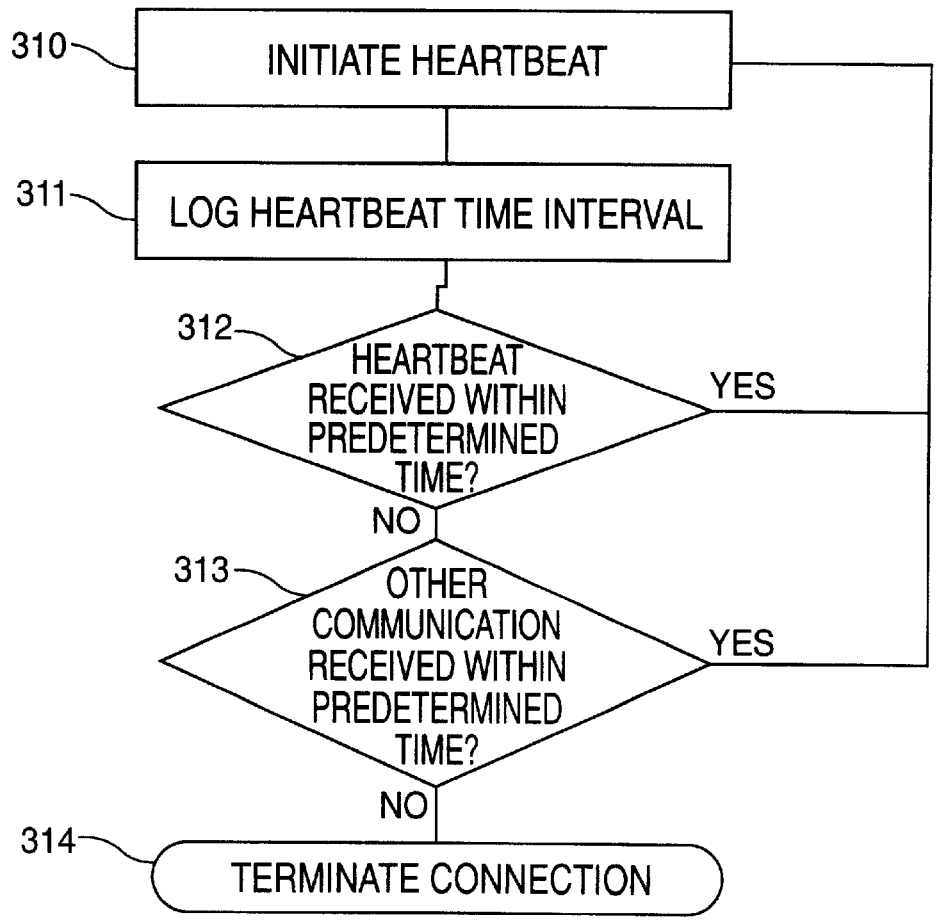
FIG. 3 illustrates a flow of a heartbeat synchronization process.

Referring now to FIG. 3, the system can utilize a transmitted Heartbeat mechanism to determine if a current session is still active. Upon login, the system can initiate a heartbeat 310 between a handheld computing device 114–116 and the HHS 113. Typically, the online management will send heartbeat information packet to the HHS 113 during idle periods. The HHS 113 can log the time interval of the heartbeat 311. The server can also interpret the receipt of the heartbeat or any other message as an indication that the HHD session is still active. A test can be performed at the completion of a maximum heartbeat interval. The system can test to a heartbeat received within the predetermined time 312. The HHD will likewise interpret the receipt of the server heartbeat or any other message as an indication that the session is still alive 313. A successful heartbeat can loop the process back to initiate a heartbeat and begin the time interval logging.

In one embodiment, if a message is not received within the specified timeout period, the online management system will assume that the session has terminated and will notify the user of the failure 314. Information that has not been sent will be lost except for executions stored in the Execution History database.

A Send Data Thread can wait for the SendData event, the Terminate event, or for the wait to timeout. The Terminate event obviously signals that the thread should shut down. Signaling of the SendData event indicates that there is data to send. If the wait timeout occurs waiting for one of these two events, it is an indication that no traffic has been sent to the server. Therefore the thread will send a heartbeat to the server in accordance with the design of connection maintenance.

In one embodiment, a Receive Data Thread can serve to block socket reads. The socket can be configured with a read timeout that is set to be equal to twice, or other mutlitple, of the heartbeat interval. If a socket read fails with a timeout error, wherein no messages have been received from the server within the required interval, the connection from the handheld 114–116 to the server is assumed to be down. The thread can then call a routine, such as CloseSocket, and the user will be notified of the failure. Communication failures can result from socket termination, network failure, severe network latency, or a server or handheld application error.

In the event that communications are terminated, the User Interface can notify the broker of the failure. The handheld 114–116 can make an automatic attempt to re-establish communications with the server. In addition the broker can manually direct the handheld 114–116 to attempt to re-establish communications with the server.

In addition, the user will be allowed to operate in an "offline mode". While in this mode limited application functionality can be available. This mode can be enabled, for example, to allow a broker to continue working should a failure occur at a critical moment such as while executing orders in the crowd. In offline mode, the broker will not be able to send or receive looks or messages or orders. However, the broker will be able to record executions on the handheld 114–116. The handheld 114–116 can essentially function as a recording device for executions. These executions can be maintained in the Execution History database such that the user can eventually have to reconcile them with the clerk manually.

If the HHS 113 detects a communications failure, it can automatically send a new order, that would otherwise be routed to a terminated handheld 114–116, to the booth responsible for the symbol corresponding with the security comprising the order. When the broker logs back in on the same or a different HHD, the broker will automatically receive all of the active orders that are still assigned to them in the online management system. Orders that were pending can again be displayed as Pending; orders that were accepted will be automatically accepted on the HHD. However, in one aspect it can be possible that an order that was accepted on the HHD may return to the pending state if the "Order Accept" message was lost during the communication failure.

Orders that had been sent back to the booth during the communications failure can be "manually" sent back to the broker's HHD from the online management system.

An exchange wireless infrastructure can provide two redundant networks. If a connection cannot be established on a current network, the HHD can prompt the broker to a "fail-over" mode in which the HHD will log into a backup network. The broker can assent or decline to perform a fail-over.

Figure 4:
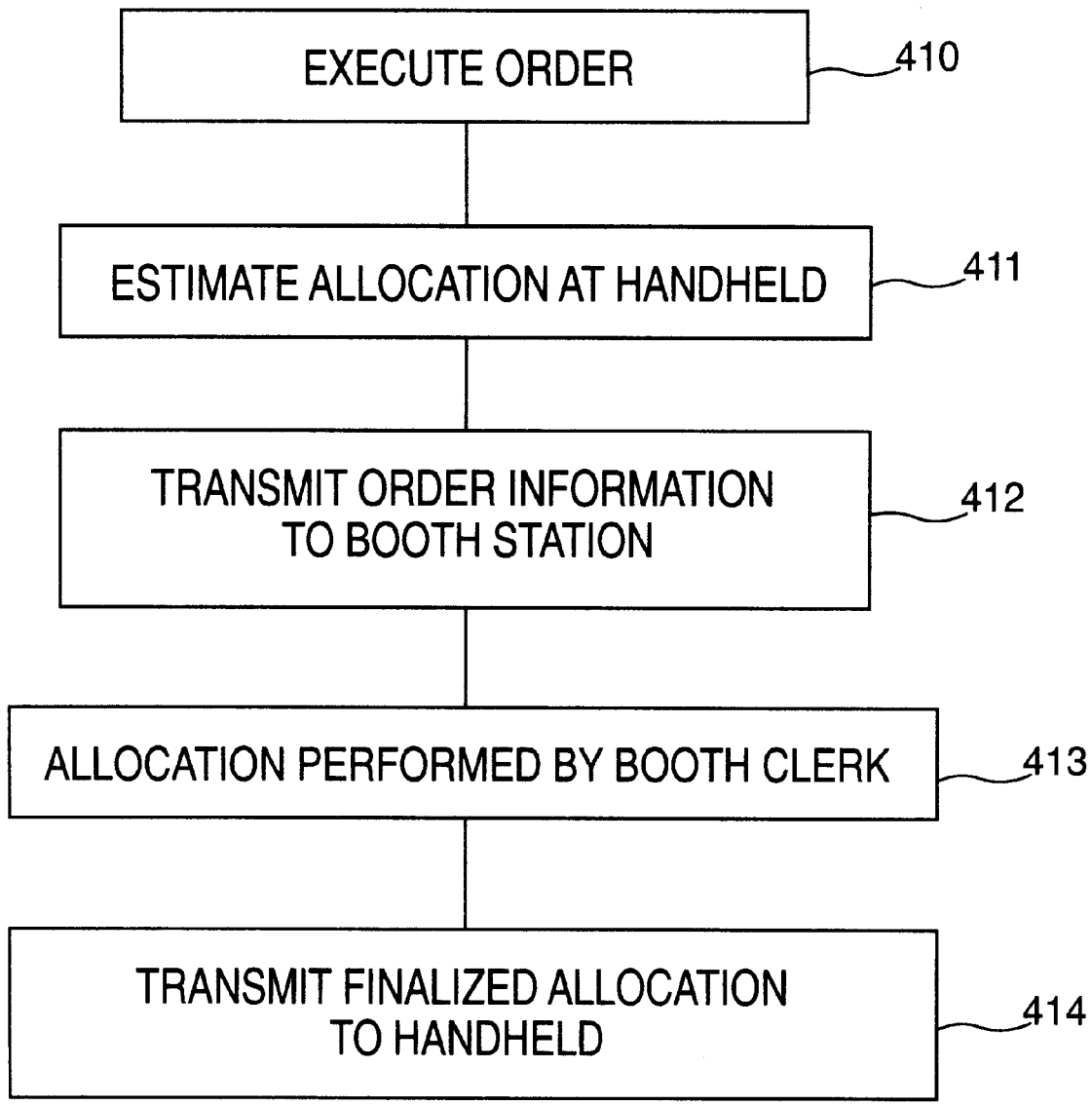
FIG. 4 illustrates a flow of an allocation of traded shares.

Referring now to FIG. 4, Allocation Estimation is a process for assigning specific quantities of shares that are traded to the orders that are eligible to participate in a trade. When a broker enters an execution 410 into a handheld computing device 114–116, the programmable code can estimate the quantity of shares that are allocated to various eligible orders 411 on the handheld 114–116. This allocation will estimate the amount of shares available for execution making up the various remaining orders. Along with the estimation 411, the handheld device 114–116 transmits the order information 412 to the associated booth station 161–163.

A clerk can perform a final allocation for an execution in the booth 413. After the clerk finishes the allocations for an execution, the allocation can be transmitted to the HHS 113 and logged 414. In addition, the allocation can be transmitted to the handheld 114–116. In one embodiment, the allocations can be transmitted automatically. "Unwinding"

is a process of replacing the handheld's 114–116 estimated allocation with an final allocation determined in the booth.

In one embodiment, an estimation allocation can be performed irrespective of whether the handheld 114–116 is able to transmit the execution to the server. Estimates can thus be calculated even if a broker is working in offline mode.

In another embodiment, an order will receive an allocation estimate for an execution when the order is for the same security as the execution and the order is for the same side as the execution. Accordingly, Long and Short Exempt sell orders can be eligible to participate in any sell execution, but Short sells can only be eligible for short sell executions. Therefore, if the side is Buy then the execution price should be lesser than or equal to the order price. If the execution is on the sell side then the execution price should be greater than or equal to the order price. A market order can satisfy any execution price.

The order centric system can also track an order timestamp. The order time stamp is the time the order reached the floor. An execution timestamp can be the time of execution. For an order to participate in an allocation, the order time stamp should be earlier than an execution time stamp, indicating that the order reached the floor before the execution was performed.

One calculation that can be used for allocation estimates first determines the set of eligible orders and averages allocation qty for each order =qty to allocate/no. of eligible orders. The quantity of shares allocated to an order can be limited to a multiple of 100. If the average qty <100 then average qty=100. The system can sort the eligible orders by the remaining quantity in ascending order. For each order the system can estimate an allocation =minimum of average estimate and order a remaining quantity if the estimated allocation is less than the average. A recalculation of a new average based on remaining shares can be allocated to remaining eligible orders. If a remaining quantity to allocate is 0 then the allocation routine can stop.

Typical trading firm business rules and SEC regulations dictate that Agency orders receive priority over Principal orders. For example, if there are 700 shares to allocate to two orders that differ only in capacity, the Agency order must receive 400 shares and the Principal order 300.

The execution quantity can exceed the sum of the remaining quantities of the eligible orders. In such cases the excess allocation quantity can be stored in an execution object. This excess quantity can remain and be factored into the total leaves for the affected security until an execution is unwound with the actual allocation from the booth.

The handheld 114–116 can operate with limited functionality if the handheld computing device 114–116 loses connection to the server. In addition, the application can enter Offline mode if a critical data error occurs.

Offline mode can implemented in all layers of an online order application. For example, a Communication Manager can be responsible for detecting a lack of heartbeats and notifying the Data Manager. The Data Manager can disconnect the Communication Manager and notify the User Interface that orders functions and look functions and messaging are unavailable. The User Interface can also notify the broker and take the necessary actions to disable features as appropriate. For example, disabling can include disabling certain windows and/or ignoring user input such as stylus taps.

In one embodiment, a Send button included in an Orders dialog, such as on an Execution Entry page will remain enabled even if the Orders system is unavailable. As a broker or other user enters and sends an execution while the Orders system is down, the execution can be persisted to the Execution History database and the user can receive a reminder that they must reconcile with the booth.

Failure Recovery can be implemented at Login time for a handheld computing device 114–116. An optional part of a Login-Reply message is a Server-Status element, which optionally contains the Recovery-Orders and Recovery-Executions elements. The Recovery-Orders element contains Order-Request messages for all of the orders that are currently assigned to a user logging in. These orders can be used to populate a Data Manager. This can be useful in the case where a broker logs in after a failure and his/her orders are still assigned to him/her; assuming that there have been no changes to orders in the online management system since the failure, the handheld 114–116 will be able display essentially the same information as when the failure occurred.

A Recovery-Executions message can contain a history of executions that have been entered into the online management system by the broker during the day. The Data Manager can use this data to update and/or reconstruct the Execution History database.

The Data Manager can process the executions and bring the state of the Execution History database in line with what is currently in the online management system if that data is more recent. However items that were already in the database that are not present in this message will not be removed. It is considered an error if the status of such an entry is Confirmed or Allocated.

The Data Manager can populate its lists with the contents of the Recovery-Orders element. After population is accomplished, the handheld 114–116 can perform an allocation estimation for any executions that have still not been allocated.

In the event there are un-reconciled executions stored on a handheld computing device 114–116, such as in the event of a network failure, the order centric system can reserve the execution history database in the database and refuse further use until the database is reconciled. The handheld computing device 114–116 can be programmed to record the User ID of a broker after a successful logon and compare this value to a User ID associated with an un-reconciled database stored in the handheld device 114–116. If the User ID logged in by the current broker is different from the User ID associated with the un-reconciled database the current will not be allowed access. This will effectively prevent executions from being overwritten.

A handheld computing device 114–116 can enter various states during normal use with an order centric tracking system. Table 1 illustrates specific examples of various handheld computing device 114–116 states and actions a programmable User Interface (UI) may associate with the specific states listed. In addition, Table 1 illustrates examples of programmable functions such as a DataManager function, a storage function, and a CommManager function that can be utilized with a handheld computing device in one embodiment of an order centric tracking system. Programmable actions associated with each state are listed to further exemplify features of this invention.

TABLE 1

| State | UI | DataManager | Storage | CommManager |
|---|---|---|---|---|
| Application Startup | Display Application Start and Initial Security Screen | Create Comm Manager and initialize internal data structures. | Initialize storage, ensure all required databases exist. | Initialize connection to HHS 113, either through sockets or queuing software. |
| User Login | Display Login screen and capture user's credentials | Pass User Credentials to Comm Manager. | N/A | Connect to HHS 113 by sending a logon-request message. Wait for a logon-reply or a timeout, whichever comes first. |
| Login Successful | Clear connection status, display main application screen | Collect User Profile Information. Inform User Interface about successful login. | Conditionally remove previous storage information. Store Login Response and profile Information in Session History. | Return logon-reply received from HHS 113 to Data Manager. |
| Login Failure | Display Login failure dialog | Retrieve login response from the Comm Manager. Inform User Interface about the login failure. | N/A | Retrieve login response from HHS 113 and return it to Data Manager. |
| Order Request Pending | Display order with visual cues to identify as Pending | Process new order request from Comm Manager. Add the new Order to internal data structures. Update Securities list as required. Inform User Interface about arrival of new order request. | Store order information, log to History | Retrieve order request from HHS 113 and forward it to Data Manager. |
| Order Request Accepted | Update display to show that order is Accepted rather than Pending | Convey the change in order status to Comm Manager. | Mark stored order information as accepted, log to History | Retrieve order-reply message from outbound queue and send to HHS 113 |
| Order Request Rejected | Remove order from UI | Send order-reply (rejected) message to Comm manager | Remove order, log to History | Retrieve order-reply from outbound queue and send to HHS 113 |
| Execution Entry | Display Execution Entry form. | Instruct UI to display Execution Entry form, providing some default values depending on the context. After User has completed the execution, update internal data structure. Perform Leaves calculation. Send the new execution to Comm Manager. | Create an Execution record in the history database and an entry in the Executions database. | Retrieve order-execute from outbound queue and send to HHS 113. |
| Order change received | Display updated information. | Update Internal Data, pass to UI. | Update order information | N/A |
| Order Details Selected | Display Order Details form. | Instruct UI to display Order Details form. | Retrieve order data | N/A |
| Task History Display | Display list of completed tasks | Instruct UI to display task history information | Retrieve completed task information | N/A |
| Display Unallocated Executions | Display list of sent but unallocated executions | Instruct UI to display information | Retrieve executions information | N/A |
| User Logoff | Display logoff confirmation dialog | Instruct UI to display logging off status, send the current profile information to Comm Manager, notify it to terminate the session | N/A | Retrieve store-profile and logoff messages from outgoing queue and send to HHS 113 |
| Network Failover | Display user instructions for network failure and device reset | Make modifications to the registry, prepare for reset, and instruct UI to give user instructions. | N/A | N/A |
| Application Error | Display application error message or show status indicator | Instruct UI to display appropriate message, possibly enter Offline mode. | Record error condition locally | N/A |

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

A number of embodiments of the present invention have been described. It will be understood that various modifications may be made without departing from the spirit and scope of the invention. All such modifications are deemed to be within the scope and spirit of the invention as defined by the appended claims.

What is claimed is:

1. A computer implemented method for processing an order for a security, the method comprising the steps of:
 receiving an order for a security into a computerized order management system;
 representing the security with a symbol in the computerized order management system;
 allocating the symbol in the computerized order management system to a booth, wherein the allocation is accomplished by an automated process executed by the computerized order management system;

allocating the symbol to a floor broker ID, wherein the allocation is accomplished by an automated process executed by the computerized order management system;

transmitting the order to a computer server;

associating a computerized booth station with the booth;

routing the order through the computer server to the computerized booth station associated with the booth to which the symbol has been allocated;

logging the floor broker ID into a handhold computing device; and routing the order through the computer server to the handheld computing device into which the floor broker ID to which the symbol has been allocated has been logged.

2. The method of claim 1 additionally comprising the steps of:

sending a record of an action relating to the order to the computer server and logging the records into a memory at the computer server.

3. The method of claim 2 additionally comprising the step of routing the record of the action through the computer server to the booth station associated with the booth to which the order symbol had been allocated.

4. The method of claim 1 wherein multiple booths are utilized and a unique set of symbols is allocated to each booth station.

5. The method of claim 4 wherein the set of symbols allocated to a floor broker ID is a unique subset of a set of symbols associated with a booth.

6. The method of claim 1 additionally comprising sending a heartbeat signal from the handheld device to the server within a predetermined time period.

7. The method of claim 6 wherein any communication between the handheld device and the server suffices as a heartbeat.

8. A method of claim 6 additionally comprising the step of logging a floor broker off of the server in response to the server not receiving a predetermined number of heartbeats.

9. The method of claim 8 wherein the predetermined number of heartbeats is two.

10. The method of claim 1 wherein an order comprises shares of stock described by the related symbol.

11. The method of claim 10 additionally comprising calculating an aggregate number of shares of stock for standing orders relating to a particular symbol.

12. The method of claim 11 additionally comprising calculating an aggregate number of shares of stock for standing orders relating to a particular stock wherein the orders meet at threshold price.

13. The method of claim 12 wherein the orders comprise buy orders.

14. The method of claim 12 wherein the orders comprise sell orders.

15. A computerized system for processing an order in a trading exchange, the system comprising:

at least one computerized booth station;

at least one handheld computing device;

a computer server linking the at least one handheld computing device and the at least one computerized booth station; and software operative with the computer server for:
routing an order to a particular one of the at least one booth station according to a security symbol associated with the order; and
routing an order to a particular one of the at least one handhold computing device according to the security symbol associated with the order.

16. The computerized system of claim 15 additionally comprising a computerized order management system linked to the computer server.

17. The computerized system of claim 15 additionally comprising a computerized recording station linked to the computer server.

18. A computer readable medium having computer executable software code stored thereon, the software code causing a computer system to:

represent a security with a symbol;

allocate a set of symbols to a booth;

allocate a set of symbols to a floor broker ID logged into a handheld computing device;

enter an order relating to a symbol into a computer;

transmit the order to a computer server;

route the order through the server to a computerized booth station associated with the booth to which the order symbol had been allocated; and route the order through the server to the handheld computing device associated with the floor broker ID to which the symbol associated with the order has been allocated.

19. The computer readable medium of claim 18 wherein the software code additionally causes a handheld computing device onto which the floor broker ID is logged to calculate an allocation of shares of a security traded to orders that are eligible to participate in a trade, following the execution of an order.

20. The method of claim 11 or 12 additionally comprising the step of displaying the aggregate number of shares of stock for standing orders on the handheld computing device.

* * * * *

UNITED STATES PATENT AND TRADEMARK OFFICE
CERTIFICATE OF CORRECTION

PATENT NO.    : 6,505,175 B1
DATED         : January 7, 2003
INVENTOR(S)   : Silverman et al.

It is certified that error appears in the above-identified patent and that said Letters Patent is hereby corrected as shown below:

<u>Column 13,</u>
Line 10, "handhold" should read -- handheld --.

<u>Column 14,</u>
Line 15, "handhold" should read -- handheld --.

Signed and Sealed this

Fourth Day of March, 2003

JAMES E. ROGAN
*Director of the United States Patent and Trademark Office*